United States Patent
Wang et al.

(10) Patent No.: US 9,681,319 B2
(45) Date of Patent: Jun. 13, 2017

(54) METHOD, USER EQUIPMENT, BASE STATION AND SYSTEM FOR MEASURING SIGNAL RECEIVED POWER

(71) Applicant: Huawei Technologies Co., Ltd., Shenzhen (CN)

(72) Inventors: Jianguo Wang, Shenzhen (CN); Yongxing Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

(21) Appl. No.: 14/560,847

(22) Filed: Dec. 4, 2014

(65) Prior Publication Data

US 2015/0085692 A1    Mar. 26, 2015

Related U.S. Application Data

(63) Continuation of application No. PCT/CN2012/076432, filed on Jun. 4, 2012.

(51) Int. Cl.
*H04W 24/08* (2009.01)
*H04B 17/318* (2015.01)
(Continued)

(52) U.S. Cl.
CPC ......... *H04W 24/08* (2013.01); *H04B 17/318* (2015.01); *H04L 5/0048* (2013.01); *H04B 17/102* (2015.01); *H04B 17/382* (2015.01)

(58) Field of Classification Search
CPC .... H04W 24/08; H04L 5/0048; H04B 17/318; H04B 17/309; H04B 17/30; H04B 17/382; H04B 17/102; H04B 17/101
(Continued)

(56) References Cited

U.S. PATENT DOCUMENTS

| 2012/0003984 A1* | 1/2012 | Cesar | H04W 72/12 455/450 |
| 2012/0099632 A1* | 4/2012 | Bury | H04J 11/0079 375/224 |

(Continued)

FOREIGN PATENT DOCUMENTS

| CN | 101626264 A | 1/2010 |
| CN | 101931965 A | 12/2010 |

(Continued)

OTHER PUBLICATIONS

"Aggregated CSI feedback with power imbalance," 3GPP TSG RAN WG1 Meeting #67, San Francisco, California, R1-113946, 3rd Generation Partnership Project, Valbonne, France (Nov. 14-18, 2011).

(Continued)

*Primary Examiner* — Kwang B Yao
*Assistant Examiner* — Syed M Bokhari
(74) *Attorney, Agent, or Firm* — Leydig, Voit & Mayer, Ltd.

(57) ABSTRACT

Embodiments of the present invention disclose a method, a user equipment, a base station and a system for measuring signal received power, wherein the method includes: obtaining, by a user equipment (UE), reference signal resource; obtaining, by the user equipment (UE), a reference signal subset and a precoding matrix, wherein the reference signal subset is a subset of a reference signal port set configured in the reference signal resource, and the precoding matrix is used for precoding the reference signal subset; and obtaining, by the user equipment (UE), signal received power according to the reference signal subset and the precoding matrix. The signal received power may be obtained under an circumstance that a tilt angle of a base station antenna (e.g., AAS) is controlled flexibly, thereby being beneficial to achieve independent uplink power control and selection of a (Continued)

cell or a node under a scenario of the above-mentioned antenna configuration.

17 Claims, 4 Drawing Sheets

(51) Int. Cl.
*H04L 5/00* (2006.01)
*H04B 17/10* (2015.01)
*H04B 17/382* (2015.01)

(58) Field of Classification Search
USPC .......................................... 370/252, 224, 329
See application file for complete search history.

(56) References Cited

U.S. PATENT DOCUMENTS

| | | | |
|---|---|---|---|
| 2012/0213261 A1* | 8/2012 | Sayana | H04L 5/0094 375/224 |
| 2014/0334328 A1* | 11/2014 | Tong | H04W 16/14 370/252 |
| 2015/0312015 A1* | 10/2015 | Chen | H04L 1/0026 370/329 |

FOREIGN PATENT DOCUMENTS

| | | |
|---|---|---|
| CN | 102255689 A | 11/2011 |
| CN | 102468947 A | 5/2012 |
| WO | WO 2011162663 A1 | 12/2011 |

OTHER PUBLICATIONS

"Way Forward on Uplink Power Control," 3GPP TSG RAN WG1 Meeting #67, San Francisco, California, R1-114415, Agenda Item: 7.5.4.2, 3$^{rd}$ Generation Partnership Project, Valbonne, France (Nov. 14-18, 2011).

"Way Forward on UL Power Control for CoMP," 3GPP TSG RAN WG1 #68, Dresden, Germany, R1-120867, Agenda item: 7.5.6.2, 3$^{rd}$ Generation Partnership Project, Valbonne, France (Feb. 6-10, 2012).

"Way Forward on UL Power Control Enhancement," 3GPP TSG RAN WG1 #67, San Francisco, California, R1-114413, Agenda item: 7.5.4.2, 3$^{rd}$ Generation Partnership Project, Valbonne, France (Nov. 14-18, 2011).

Search report in corresponding Chinese Patent Application No. 2012800013119 (Nov. 11, 2016).

* cited by examiner

METHOD, USER EQUIPMENT, BASE STATION AND SYSTEM FOR MEASURING SIGNAL RECEIVED POWER

CROSS-REFERENCE TO RELATED APPLICATIONS

This application is a continuation of International Application No. PCT/CN2012/076432, filed on Jun. 4, 2012, which is hereby incorporated by reference in its entirety.

TECHNICAL FIELD

The present invention relates to communications, and in particular to a method, a user equipment, a base station and a system for measuring signal received power.

BACKGROUND

In the technical field of communications, signal received power is usually used for power control and selection of a cell, a transmitting node or a receiving node. Power control is an effective solution for achieving uplink adaption and interference control. In an existing long term evolution (Long Term Evolution, LTE) R8-R10 system, uplink power control is based on open loop control and closed loop control, wherein the open loop control part is achieved based on path loss estimation, and the path loss estimation is obtained based on reference signal received power (Reference Signal Received Power, RSPR); and the closed loop control is performing closed loop correction to the open loop control part. The above-mentioned uplink power control solution may work quite well for conventional antenna configuration of a base station, wherein the conventional antenna configuration of the base station has a fixed downward tilt angle, and uplink and downlink experience similar path losses, thus downlink path loss may be nicely used for estimating uplink path loss. In addition, RSRP of a present cell/node or a neighboring cell/node reported by a user equipment (User Equipment, UE) may be used by a base station or an evolved node B (evolved Node, eNB) to select a serving cell or node for the UE.

To reduce system cost while achieving higher system capacity and coverage requirement, active antenna systems (Active Antenna Systems, AAS) have been widely deployed in practice, and at present, an upcoming LTE R12 standard is considering enhancement of communication performance by introducing an AAS system. Unlike a conventional base station antenna, the AAS further provides a design freedom in a vertical direction of an antenna. In this case, uplink and downlink may adopt independent downward tilt angles, both of which may be controlled flexibly. Under this circumstance, in an existing LTE R8-R10 system, a method for achieving power control or selecting a cell/node based on downlink reference signal received power in the prior art is not effective any more.

SUMMARY

Embodiments of the present invention provide a method, a user equipment, a base station and a system for measuring signal received power, which may calculate signal received power under a circumstance that a tilt angle of an eNB or a base station is configured flexibly, and achieve power control or selection of a cell/node.

In one aspect, an embodiment of the present invention provides a method for measuring signal received power, including:

obtaining, by a user equipment (UE), reference signal resource;

obtaining, by the user equipment (UE), a reference signal subset and a precoding matrix, wherein the reference signal subset is a subset of a reference signal port set configured in the reference signal resource, and the precoding matrix is used for precoding the reference signal subset; and obtaining, by the user equipment (UE), signal received power according to the reference signal subset and the precoding matrix.

In one aspect, an embodiment of the present invention further provides another method for measuring signal received power, including:

obtaining, by a user equipment (UE), reference signal resource;

obtaining, by the user equipment (UE), a reference signal subset which is precoded; and obtaining, by the user equipment (UE), signal received power based on the reference signal subset which is precoded;

wherein the reference signal subset is a subset of a reference signal port set configured in the reference signal resource, and the reference signal subset, which is precoded, is obtained by precoding the reference signal subset based on a precoding matrix by a base station eNB.

In another aspect, an embodiment of the present invention further provides a method for measuring signal received power, including:

configuring, by a base station eNB, reference signal resource; and sending, by the base station eNB, a reference signal subset, or sending a reference signal subset and a precoding matrix, to a user equipment (UE), so as to enable the user equipment (UE) to obtain signal received power based on the reference signal subset or based on the reference signal subset and the precoding matrix;

wherein the reference signal subset is a subset of a reference signal port set configured in the reference signal resource.

In another aspect, an embodiment of the present invention further provides another method for measuring signal received power, including:

configuring, by a base station eNB, reference signal resource; and sending, by the base station eNB, a reference signal subset which is precoded to a user equipment (UE), so as to enable the user equipment (UE) to obtain signal received power based on the reference signal subset which is precoded;

wherein a reference signal subset is a subset of a reference signal port set configured in the reference signal resource, and the reference signal subset, which is precoded, is obtained by precoding the reference signal subset based on a precoding matrix by the base station eNB.

In one aspect, correspondingly, an embodiment of the present invention further provides a user equipment for measuring signal received power, including:

a first obtaining module, configured to obtain reference signal resource;

a second obtaining module, configured to obtain a reference signal subset and a precoding matrix, wherein the reference signal subset is a subset of a reference signal port set configured in the reference signal resource, and the precoding matrix is used for precoding the reference signal subset; and a received power calculating module, configured to obtain signal received power according to the reference signal subset and the precoding matrix.

Correspondingly, an embodiment of the present invention further provides another base station for measuring signal received power, including:

a configuring module, configured to configure reference signal resource; and a sending module, configured to send a reference signal subset, or send a reference signal subset and a precoding matrix to a user equipment (UE), so as to enable the user equipment (UE) to obtain signal received power based on the reference signal subset or based on the reference signal subset and the precoding matrix;

wherein the reference signal subset is a subset of a reference signal port set configured in the reference signal resource.

Correspondingly, an embodiment of the present invention further provides a system for measuring signal received power, including the above-mentioned user equipment and base station.

In another aspect, correspondingly, an embodiment of the present invention further provides another user equipment for measuring signal received power, including:

a first obtaining module, configured to obtain reference signal resource;

a second obtaining module, configured to obtain a reference signal subset which is precoded; and a received power calculating module, configured to obtain signal received power according to the reference signal subset which is precoded;

wherein the reference signal subset is a subset of a reference signal port set configured in the reference signal resource, and the reference signal subset, which is precoded, is obtained by precoding the reference signal subset based on a precoding matrix by a base station eNB.

Correspondingly, an embodiment of the present invention further provides another base station for measuring signal received power, including:

a configuring module, configured to configure reference signal resource;

a precoding module, configured to precode a reference signal subset based on a precoding matrix to obtain a reference signal subset which is precoded, wherein the reference signal subset is a subset of a reference signal port set configured in the reference signal resource; and a sending module, configured to send the reference signal subset which is precoded to a user equipment (UE), so as to enable the user equipment (UE) to obtain signal received power based on the reference signal subset which is precoded.

Correspondingly, an embodiment of the present invention further provides another system for measuring signal received power, including the above-mentioned user equipment and base station.

By implementing the embodiments of the present invention, the following benefits can be achieved:

in the present invention, by obtaining reference signal resource, a reference signal subset and a precoding matrix, signal received power may be obtained under an circumstance that a tilt angle of a base station antenna (e.g., AAS) is controlled flexibly, and the signal received power is beneficial to achieve independent uplink power control and selection of a cell or a node under a scenario of the above-mentioned antenna configuration.

BRIEF DESCRIPTION OF DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings may be obtained by those of ordinary skill in the art without any creative effort.

DESCRIPTION OF EMBODIMENTS

The technical solutions in the embodiments of the present invention will be described clearly and fully hereinafter in conjunction with the drawings in the embodiments of the present invention. Apparently, the embodiments described are only a part, but not all, of the embodiments of the present invention. All other embodiments, which can be derived by the persons of ordinary skills in the art based on the embodiments of the present invention without any inventive efforts, fall into the protection scope of the present invention.

Figure 1:
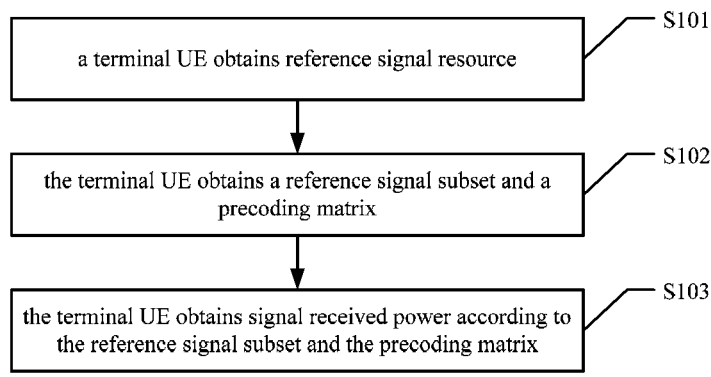
FIG. 1 is a schematic flow of a first embodiment of a method for measuring signal received power of the present invention.

Referring to FIG. 1, a schematic flow of a first embodiment of a method for measuring signal received power of the present invention is depicted. The embodiment of the present invention illustrates the method for measuring signal received power in detail from a user equipment side, and the method specifically includes the following steps.

S101: a user equipment (UE) obtains reference signal resource.

Specifically, the obtaining the reference signal resource by the user equipment (UE) may include that, the user equipment (UE) obtains the reference signal resource by receiving a signaling, such as, for example, a radio resource control (Radio Resource Control, RRC) signaling or downlink control information (Downlink control information, DCI), that is notified by an eNB; or the user equipment (UE) may obtain the reference signal resource based on predefined information, such as, for example, a cell identifier.

Specifically, the reference signal resource may be reference signal resource notified by the base station eNB through a signaling, which includes reference signal resource sent from the eNB to the user equipment (UE) through an RRC signaling or DCI.

Specifically, the reference signal resource may be channel state information reference signal (channel state information Reference Signal, CSI RS) resource, wherein the CSI RS resource may be a combination of a resource configuration and a subframe configuration of CSI RS. The resource configuration may be a port configuration of CSI RS in a resource block (RB, Resource Block), such as, for example, occupying different subcarriers, symbols or sequences. The subframe configuration may be a period or an offset of subframes.

The reference signal resource may also be demodulation reference signal (demodulation RS, DM RS) resource, wherein the DM RS resource may be a resource configuration of DM RS, such as, for example, a port. The DM RS resource may also be a combination of a resource configuration and a subframe configuration of DM RS, such as, for example, DMRSs with different ports and with different subframe periods or offsets, wherein a period or an offset of DMRS subframes may be predefined and are known to both of the UE and the eNodeB.

The reference signal resource may also be cell-specific reference signal (cell-specific RS, CRS) resource. The CRS resource may be a resource configuration including CRS, such as, for example, a port; or may be a combination of a resource configuration and a subframe configuration of CRS, such as, for example, CRSs with different ports and with different subframe periods or offsets, wherein a period or an offset of CSI subframes may be predefined and are known to both of the UE and the eNodeB.

The reference signal resource may be UE-specific, or may be cell-specific.

S102: the user equipment (UE) obtains a reference signal subset and a precoding matrix, wherein the reference signal subset is a subset of a reference signal port set configured in the reference signal resource, and the precoding matrix is configured to precode the reference signal subset.

A subset of reference signals may be predefined. For example, it is predefined to select the first reference signal or select the first and the second reference signals of the reference signal port set configured in the configured reference signal resource as a subset of reference signals.

The subset of reference signals may also be notified by an eNodeB (referred to as eNB) through an RRC signaling, or be notified by an eNB through downlink control information (DCI), or be selected, in accordance with an instruction on a downlink control channel, from existing reference signal resources notified by an RRC signaling.

The user equipment (UE) may obtain the reference signal subset based on predefined information or by receiving a notification, such as, for example, an RRC signaling or DCI.

It should be noted that, the reference signal subset may only include one reference signal or a plurality of reference signals or all reference signals in the reference signal port set configured in the reference signal resource.

The reference signal subset may be cell-specific or node-specific, or may be UE-specific.

The precoding matrix is contained in a precoding matrix set or in a codebook, and each precoding matrix in the precoding matrix set or in the codebook is indicated by one or multiple indexes. The indexes may be a rank indicator (Rank Indicator, RI) and a precoding matrix (Precoding Matrix Indicator, PMI) indicator, namely, RI/PMI, or may be only a PMI indicator.

The obtaining the precoding matrix by the user equipment (UE) may specifically include that the user equipment (UE) obtains an index for indicating a precoding matrix and obtains the precoding matrix based on the index, which may be implemented by the following manners.

In a first manner, the index for indicating the precoding matrix is notified to the user equipment (UE) by the base station eNB. The user equipment (UE) obtains the precoding matrix according to one or multiple indexes for indicating the precoding matrix that are notified by the eNB.

The eNB may semi-statically notify through an RRC signaling or dynamically notify through DCI.

The one or multiple indexes for indicating the precoding matrix that are notified by the base station eNB may be obtained in the following manners.

The base station eNB may obtain the one or multiple indexes for indicating a precoding matrix based on an uplink reference signal and by utilizing channel reciprocity, which includes that, the eNB obtains an uplink channel estimation value by performing calculation based on an uplink reference signal, such as, for example, a sounding reference signal (Sounding RS, SRS), and obtains a downlink channel estimation value according to channel reciprocity; and selects, according to the downlink channel estimation, an optimal precoding matrix from the precoding matrix set or from the codebook based on a predefined criterion, such as, for example, a channel capacity maximization criterion or a throughput maximization criterion. In this case, one or multiple indexes may be obtained and used for indicating the selected precoding matrix in the precoding matrix set or in the codebook. Wherein selecting a precoding matrix based on a predefined criterion, such as, for example, a channel capacity maximization criterion or a throughput maximization criterion, is an existing technology, and will not be described redundantly herein.

The base station eNB may also obtain one or multiple indexes for indicating a precoding matrix based on channel state information (CSI) reported by the UE, which includes that, the eNB obtains one or multiple indexes for indicating a precoding matrix based on one or multiple pieces of CSI reported by the UE recently, wherein the CSI reported by the user equipment (UE) to the eNB is used for a downlink data transmission, such as, for example, a physical downlink shared channel (PDSCH) transmission.

The CSI reported to the eNB by the user equipment (UE) includes that, the user equipment (UE) obtains a channel estimation value based on a downlink reference signal; and the UE selects, according to the downlink channel estimation, an index corresponding to a determined precoding matrix based on a predefined criterion, such as, for example, a channel capacity maximization criterion or a throughput maximization criterion, and by utilizing a predefined precoding matrix set or a codebook and a mapping relationship of one or multiple indexes with a precoding matrix, and reports the index to the eNB, such as, for example, RI/PMI and the like.

It should be noted that, when the eNB obtains one or multiple indexes for indicating a precoding matrix based on one or multiple pieces of CSI reported by the UE recently, the base station eNB may adjust an index notified to the UE according to practical requirements, for example, a tilt angle may be adjusted moderately according to an interference condition.

In a second manner, the index for indicating the precoding matrix is obtained based on channel state information (CSI) reported by the user equipment (UE), which includes that, the user equipment (UE) obtains an index for indicating a precoding matrix according to latest channel state information (CSI) reported by the user equipment (UE).

The CSI reported by the user equipment (UE) to the eNB is used for a downlink data transmission, such as, for example, a physical downlink shared channel (PDSCH) transmission. How to calculate the CSI reported to the eNB by the user equipment (UE) is an existing technology, and will not be described redundantly herein.

In a third manner, the index for indicating the precoding matrix is predefined.

There exists a mapping relationship or a functional relationship between the predefined index and the precoding matrix indicated by the predefined index, and the mapping relationship or the functional relationship is known to both of the user equipment (UE) and the base station eNB.

The index for indicating a precoding matrix is predefined. For example, the index for indicating a precoding matrix may have a predefined mapping relationship or functional relationship with a reference signal port. Further, the predefined index for indicating the precoding matrix is associated with a subframe or a timeslot.

S103: the user equipment (UE) obtains signal received power according to the reference signal subset and the precoding matrix.

Specifically, the signal received power is a linear average over received powers on a considered measurement bandwidth, wherein the received powers are obtained by precoding a channel on a resource unit carrying the reference signal by using the precoding matrix.

Specifically, the obtaining signal received power according to the reference signal subset and the precoding matrix includes the following steps:

performing, concerning a considered measurement bandwidth, channel estimation on a resource unit carrying the reference signal according to the reference signal subset to obtain a channel estimation value;

obtaining a precoded channel estimation value through a calculation according to the channel estimation value and the precoding matrix, for example, channel estimation obtained through a reference signal or a reference signal subset is H and a precoding matrix is P, then a channel after precoding is He=HP; and obtaining multiple (He)s based on respective resource units carrying the reference signals, thus obtaining corresponding received powers, and obtaining signal received power by linearly averaging the above-mentioned powers on the considered measurement bandwidth.

For example, signal received power on a certain resource unit or on a unit set k may be:

$$SRP_k = \frac{1}{mn}\sum_{i=1}^{m}\sum_{j=1}^{n}|(H_e)_{ij}|^2$$

where SPPk is signal received power on a single resource unit (RE) or unit set, m is the number of receiving antennas of a base station, and n is the number of precoded transmitting antenna ports. Signal received powers SPPk(s) on the respective resource units (Res) or unit sets are linearly averaged on the considered measurement bandwidth to obtain the signal received power.

In addition, other suitable signal received power may also be adopted, for example, a proper scaling factor is multiplied. The above-mentioned reference signal received powers of all resource units or resource unit sets on the considered measurement bandwidth are linearly averaged to obtain currently estimated signal received power.

In addition, it should be noted that, in the above-mentioned calculation of the signal received power, it may be considered that precoding is performed by means of only a precoding matrix composed of column subsets in the precoding matrix.

It should be noted that, similarly, measurement information such as signal received quality (Signal Received Quality, SRQ), a signal strength indicator (Signal Strength Indicator, SSI) and the like may also be obtained by utilizing the above-mentioned reference signal subset and the precoding matrix, namely, after the precoded channel estimation value is obtained, a calculation similar to the one for reference signal received quality (Reference Signal Received Quality, RSRQ) or a reference signal strength indicator (Reference Signal Strength Indicator, RSSI) may be performed, and may be used as RSRQ or RSSI.

Further, the method of the present embodiment may further include that the user equipment (UE) calculates path loss based on the signal received power.

Specifically, after the UE obtains the signal received power, the signal received power may be taken as reference signal received power (RSRP), and the path loss is calculated by using an existing method. For example, in an LTE R8-R10 system, in a power control formula of a physical uplink control channel (Physical Uplink Control Channel, PUCCH) or a physical uplink shared channel (Physical Uplink shared channel, PUSCH), path loss is obtained by using a method utilizing reference signal received power (RSRP) of high-level filtering.

Or, further, the method of the present embodiment may further include that the user equipment (UE) reports the obtained signal received power to the base station eNB, and the signal received power is taken as reference signal received power for selecting a cell or a node.

Specifically, after the UE obtains the signal received power, the signal received power may be reported to the base station eNB as the reference signal received power (RSRP), and is used for cell or node selection.

It can be seen from the descriptions of the above-mentioned embodiment that, the present invention has the following advantages:

in the present invention, by obtaining reference signal resource, a reference signal subset and a precoding matrix, signal received power may be obtained under an circumstance that a tilt angle of a base station antenna (e.g., AAS) is controlled flexibly, and the signal received power is beneficial to achieve independent uplink power control and selection of a cell or a node under a scenario of the above-mentioned antenna configuration.

Figure 2:
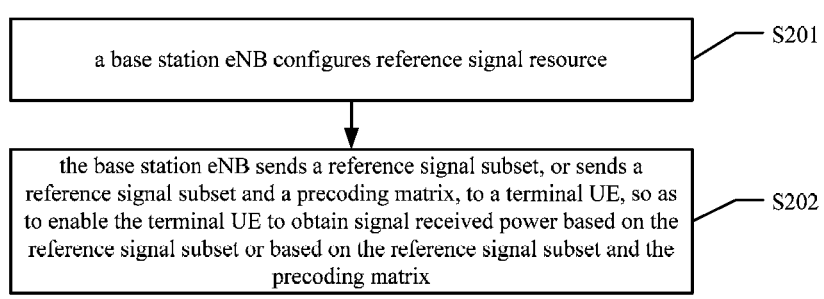
FIG. 2 is a schematic flow of a second embodiment of the method for measuring signal received power of the present invention.

Referring to FIG. 2, a schematic flow of a second embodiment of the method for measuring signal received power of the present invention is depicted. The embodiment of the present invention illustrates the method for measuring signal received power in detail from a base station eNB side, and the method includes the following steps.

S201: a base station eNB configures reference signal resource.

S202: the base station eNB sends a reference signal subset, or sends a reference signal subset and a precoding matrix, to a user equipment (UE), so as to enable the user equipment (UE) to obtain signal received power based on the reference signal subset or based on the reference signal subset and the precoding matrix.

The reference signal subset is a subset of a reference signal port set configured in the reference signal resource. The reference signal subset is predefined, and for example, is predefined based on the reference signal port set configured in the reference signal resource; or, the reference signal subset is notified by the base station eNB, and for instance, the reference signal subset is selected from the reference signal port set configured in the reference signal resource and is notified to the user equipment (UE), for instance, through an RRC signaling or DCI.

The sending the reference signal subset or sending the reference signal subset and the precoding matrix to the user equipment (UE), includes:

sending, by the eNB, the reference signal subset to the user equipment (UE), so as to enable the UE to obtain one or multiple indexes for indicating a precoding matrix based on the reference signal subset and latest channel state information (CSI) reported by the UE, or so as to enable the UE to obtain a precoding matrix based on a predefined precoding matrix index and further obtain signal received power;

or sending, by the eNB, the reference signal subset to the user equipment (UE), and sending one or multiple indexes for indicating the precoding matrix to the UE by carrying the one or multiple indexes in notification information.

The precoding matrix is contained in a precoding matrix set or in a codebook, and each precoding matrix in the precoding matrix set or in the codebook is indicated by one or multiple indexes.

The one or multiple indexes for indicating the precoding matrix are obtained by the eNB based on received channel state information (CSI) reported by the user equipment (UE), wherein the CSI contains one or multiple indexes for indicating a precoding matrix;

or the one or multiple indexes for indicating the precoding matrix are obtained by the eNB based on an uplink reference signal and by utilizing channel reciprocity, which includes that, the eNB performs a calculation based on an uplink reference signal, such as, for example, a sounding reference signal (Sounding RS, SRS), so as to obtain an uplink channel estimation value, and obtains a downlink channel estimation value according to channel reciprocity; and obtains, according to the downlink channel estimation value, an index corresponding to the selected precoding matrix based on a predefined criterion, such as, for example, a channel capacity maximization criterion or a throughput maximization criterion, and based on a corresponding relationship between one or multiple indexes and a precoding matrix in a precoding matrix set or in a codebook.

Further, the method may further include that, the base station eNB receives the signal received power reported by the user equipment (UE), and takes the signal received power as reference signal received power for selecting a cell or a node.

It can be seen from the descriptions of the above-mentioned embodiment that, the present invention has the following advantages:

in the present invention, by obtaining reference signal resource, a reference signal subset and a precoding matrix, signal received power may be obtained under an circumstance that a tilt angle of a base station antenna (e.g., AAS) is controlled flexibly, and the signal received power is beneficial to achieve independent uplink power control and selection of a cell or a node under a scenario of the above-mentioned antenna configuration.

Figure 3:
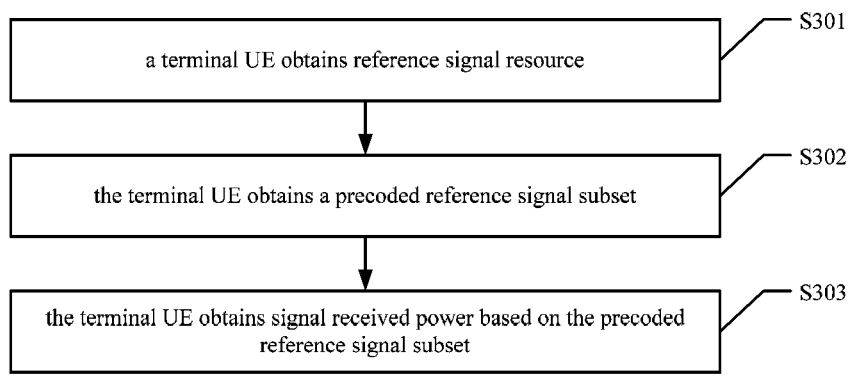
FIG. 3 is a schematic flow of a third embodiment of the method for measuring signal received power of the present invention.

Referring to FIG. 3, a schematic flow of a third embodiment of the method for measuring signal received power of the present invention is depicted. The embodiment of the present invention illustrates another method for measuring signal received power on the user equipment side in detail, and the method specifically includes the following steps.

S301: a user equipment (UE) obtains reference signal resource.

Specifically, the obtaining the reference signal resource by the user equipment (UE) may include that, the user equipment (UE) obtains the reference signal resource by receiving a notification, such as, for example, a radio resource control (Radio Resource Control, RRC) signaling or downlink control information (Downlink control information, DCI); or the user equipment (UE) may obtain the reference signal resource based on predefined information, such as, for example, a cell identifier.

The reference signal resource may be reference signal resource notified by the base station eNB through a signaling, which includes reference signal resource sent from the eNB to the user equipment (UE) through an RRC signaling or DCI.

Specifically, the reference signal resource may be channel state information reference signal (channel state information Reference Signal, CSI RS) resource, wherein the CSI RS resource may be a combination of a resource configuration and a subframe configuration of CSI RS. The resource configuration may be a port configuration of CSI RS in a resource block (Resource Block, RB), such as, for example, occupying different subcarriers, symbols or sequences. The subframe configuration may be a period or an offset of a subframes.

Or, the reference signal resource may be demodulation reference signal (demodulation RS, DM RS) resource, wherein the DM RS resource may be a resource configuration of a DMRS, such as, for example, a port. The DM RS resource may also be a combination of a resource configuration and a subframe configuration of DM RS, such as, for example, DMRSs with different ports and with different subframe periods or offsets, wherein a period or an offset of DMRS subframes may be predefined and are known to both of the UE and the eNodeB.

Or, the reference signal resource may be cell-specific reference signal (cell-specific RS, CRS) resource. The CRS resource may be a resource configuration including CRS, such as, for example, a port; or may be a combination of a resource configuration and a subframe configuration of CRS, such as, for example, CRSs with different ports and with different subframe periods or offsets, wherein a period or an offset of CSI subframes may be predefined and are known to both of the UE and the eNodeB.

S302: the user equipment (UE) obtains a reference signal subset which is precoded, wherein a reference signal subset is a subset of a reference signal port set configured in the reference signal resource, and the reference signal subset, which is precoded, is obtained by precoding the reference signal subset based on a precoding matrix by the base station eNB.

A subset of reference signals may be predefined. For example, it is predefined to select the first reference signal or select the first and the second reference signals of the reference signal port set configured in the configured reference signal resource as a subset of reference signals.

The subset of reference signals may also be notified by an eNodeB (referred to as eNB) through an RRC signaling, or be notified by an eNB through downlink control information (DCI), or be selected, in accordance with an instruction on a downlink control channel, from existing reference signal resources notified by an RRC signaling.

The user equipment (UE) may obtain the reference signal subset which is precoded based on predefined information or by receiving a notification, such as, for example, an RRC signaling or DCI.

The reference signal subset may be cell-specific or node-specific, or may be UE-specific.

The obtaining a reference signal subset, which is precoded, by precoding a reference signal subset based on a precoding matrix by the base station eNB includes that, based on an uplink reference signal, such as, for example, a sounding reference signal (Sounding RS, SRS), by utilizing channel reciprocity, and based on a predefined criterion, such as, for example, a channel capacity maximization criterion or a throughput maximization criterion, the base station eNB obtains the precoding matrix by means of singular value decomposition or eigenvalue decomposition, or obtains the precoding matrix by selecting from a predefined codebook. The process is the prior art, and will not be repeated redundantly herein; and then, the base station precodes the reference signal subset according to the precoding matrix, so as to obtain the reference signal subset which is precoded.

Or, the precoding the reference signal subset based on a precoding matrix by the base station eNB includes that, the base station eNB obtains an index for indicating a precoding matrix, obtains the precoding matrix based on the index, and precodes the reference signal subset based on the precoding matrix.

The index for indicating a precoding matrix is obtained by the base station eNB based on channel state information (CSI) reported by the user equipment (UE), which includes that, the eNB obtains one or multiple indexes for indicating a precoding matrix based on one or multiple pieces of CSI reported by the UE recently, wherein the CSI reported to the eNB by the user equipment (UE) is used for downlink data transmission, such as, for example, a physical downlink shared channel (PDSCH) transmission. Reporting the CSI for downlink data transmission to the eNB by the user equipment (UE) is the prior art, and will not be described redundantly herein.

Or, the index for indicating a precoding matrix is predefined. For example, there exists a mapping relationship or a functional relationship between an index for indicating a precoding matrix and a reference signal port, wherein the mapping relationship or the functional relationship may be associated with a specific subframe or timeslot.

S303: the user equipment (UE) obtains signal received power based on the reference signal subset which is precoded.

Specifically, the signal received power is a linear average over received powers on resource units carrying the precoded reference signal(s) on a considered measurement bandwidth.

Specifically, the obtaining signal received power based on the reference signal subset which is precoded includes that, concerning a considered measurement bandwidth, channel estimation is preformed on a resource unit carrying the reference signal subset, which is precoded, according to the reference signal subset which is precoded, so as to obtain a channel estimation value He; and multiple (He)s are obtained based on respective resource units carrying the reference signal subset which is precoded, thus obtaining corresponding received powers, and the above-mentioned powers are linearly averaged on the considered measurement bandwidth to obtain the signal received power.

For example, the signal received power on a certain resource unit or on a unit set k may be:

$$SRP_k = \frac{1}{mn}\sum_{i=1}^{m}\sum_{j=1}^{n}|(H_e)_{ij}|^2$$

where SPPk is signal received power on a single resource unit (RE) or unit set, m is the number of receiving antennas of a base station, and n is the number of precoded transmitting antenna ports. Signal received powers SPPk(s) on the above-mentioned respective resource units (Res) or unit sets are linearly averaged on the considered measurement bandwidth to obtain the signal received power.

In addition, other suitable signal received power may also be adopted, for example, a proper scaling factor is multiplied. The above-mentioned reference signal received powers of all resource units or resource unit sets on the considered measurement bandwidth are linearly averaged to obtain currently estimated signal received power.

It should be noted that, similarly, measurement information such as signal received quality (Signal Received Quality, SRQ), a signal strength indicator (Signal Strength Indicator, SSI) and the like may also be obtained by utilizing the above-mentioned reference signal subset and the precoding matrix, namely, after the precoded channel estimation value is obtained, a calculation similar to the one for reference signal received quality (Reference Signal Received Quality, RSRQ) or a reference signal strength indicator (Reference Signal Strength Indicator, RSSI) may be performed, and may be used as RSRQ or RSSI.

Further, the user equipment (UE) calculates path loss based on the signal received power.

Specifically, after the UE obtains the signal received power, the signal received power may be taken as reference signal received power (RSRP), and the path loss is calculated by using an existing method. For example, in an LTE R8-R10 system, in a power control formula of a physical uplink control channel (Physical Uplink Control Channel, PUCCH) or a physical uplink shared channel (Physical Uplink shared channel, PUSCH), path loss is obtained by using a method utilizing reference signal received power (RSRP) of high-level filtering.

Or, further, the method of the present embodiment may further include that the user equipment (UE) reports the obtained signal received power to the base station eNB, and the signal received power is taken as reference signal received power for selecting a cell or a node.

It can be seen from the descriptions of the above-mentioned embodiment that, the present invention has the following advantages:

in the present invention, by obtaining reference signal resource, a reference signal subset and a precoding matrix, signal received power may be obtained under an circumstance that a tilt angle of a base station antenna (e.g., AAS) is controlled flexibly, and the signal received power is beneficial to achieve independent uplink power control and selection of a cell or a node under a scenario of the above-mentioned antenna configuration.

Figure 4:
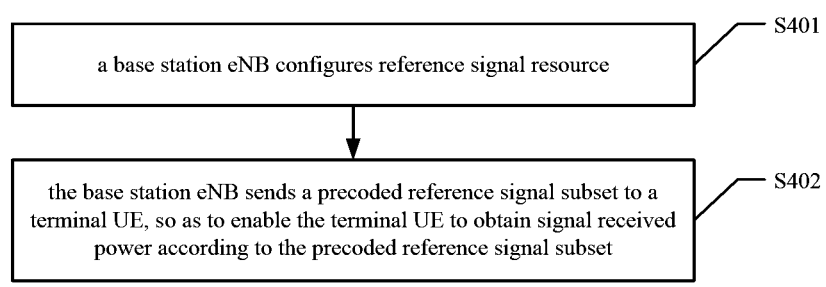
FIG. 4 is a schematic flow of a fourth embodiment of the method for measuring signal received power of the present invention.

Referring to FIG. 4, a schematic flow of a fourth embodiment of the method for measuring signal received power of the present invention is depicted. The embodiment of the present invention illustrates another method for measuring signal received power on the base station side, and the method specifically includes the following steps.

S401: a base station eNB configures reference signal resource.

S402: the base station eNB sends a reference signal subset which is precoded to a user equipment (UE), so as to enable the user equipment (UE) to obtain signal received power according to the reference signal subset which is precoded.

A reference signal subset is a subset of a reference signal port set configured in the reference signal resource, and the reference signal subset, which is precoded, is obtained by precoding the reference signal subset based on a precoding matrix by the base station eNB.

The subset is predefined, and for example, is predefined based on a reference signal set configured in the reference signal resource; or the subset is notified by the base station eNB, and for example, is notified to the user equipment (UE) through an RRC signaling or DCI.

Wherein the reference signal subset, which is precoded, is obtained by precoding a reference signal subset based on a precoding matrix by the base station eNB, which includes that, based on an uplink reference signal, such as, for example, a sounding reference signal (Sounding RS, SRS), by utilizing channel reciprocity, and based on a predefined criterion, such as, for example, a channel capacity maximization criterion or a throughput maximization criterion, the base station eNB obtains the precoding matrix by means of singular value decomposition or eigenvalue decomposition, or obtains the precoding matrix by selecting from a predefined codebook. The process is the prior art, and will not be repeated redundantly herein.

Or, the precoding a reference signal subset based on a precoding matrix by the base station eNB includes that, the base station eNB obtains an index for indicating a precoding matrix, obtains the precoding matrix based on the index, and precodes the reference signal subset based on the precoding matrix.

The index for indicating a precoding matrix is obtained by the base station eNB based on channel state information (CSI) reported by the user equipment (UE), which includes that, the eNB obtains one or multiple indexes for indicating a precoding matrix based on one or multiple pieces of CSI reported by the UE recently, wherein the CSI reported by the user equipment (UE) to the eNB is used for downlink data transmission, such as, for example, a physical downlink shared channel (PDSCH) transmission. Reporting the CSI for downlink data transmission to the eNB by the user equipment (UE) is the prior art, and will not be described redundantly herein.

Or, the index for indicating a precoding matrix is predefined. For example, there exists a mapping relationship or a functional relationship between an index for indicating a precoding matrix and a reference signal port, wherein the index for indicating a precoding matrix may be associated with a specific subframe or timeslot. A process for calculating the signal received power by the user equipment (UE) is the same as that in the above-mentioned embodiment.

Further, the method of the present embodiment may further include that, the base station eNB receives signal received power reported by the user equipment (UE), and takes the signal received power as reference signal received power for selecting a cell or a node.

It can be seen from the descriptions of the above-mentioned embodiment that, the present invention has the following advantages:

in the present invention, by obtaining reference signal resource, a reference signal subset and a precoding matrix, signal received power may be obtained under an circumstance that a tilt angle of a base station antenna (e.g., AAS) is controlled flexibly, and the signal received power is beneficial to achieve independent uplink power control and selection of a cell or a node under a scenario of the above-mentioned antenna configuration.

Hereinafter, a system, a base station and a user equipment for measuring signal received power of the present invention are illustrated in detail.

Figure 5:
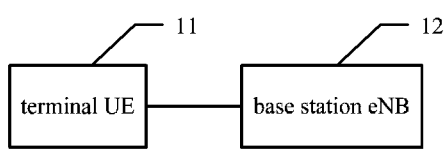
FIG. 5 is a schematic diagram of an arrangement of a first embodiment of a system for measuring signal received power of the present invention.
Figure 6:
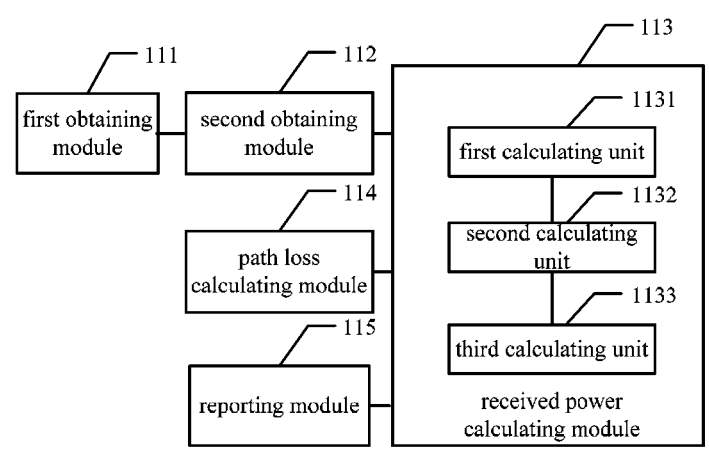
FIG. 6 is a schematic diagram of an arrangement of a user equipment for measuring signal received power in FIG. 5.
Figure 7:
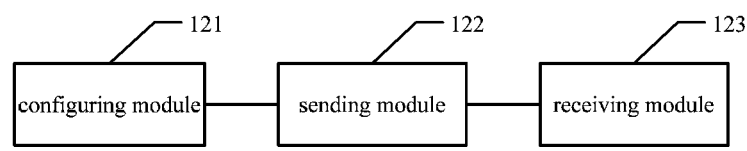
FIG. 7 is a schematic diagram of an arrangement of a base station for measuring signal received power in FIG. 5.

Referring to FIG. 5, an arrangement of an embodiment of a system for measuring signal received power of the present invention is depicted. The system of the embodiment of the present invention includes a user equipment (UE) 11 and a base station eNB 12. FIG. 6 is referred to for a structure of the user equipment (UE) 11, and FIG. 7 is referred to for a structure of the base station eNB 12. Specifically, the user equipment (UE) 11 includes a first obtaining module 111, a second obtaining module 112 and a received power calculating module 113.

The first obtaining module 111 is configured to obtain reference signal resource.

The second obtaining module 112 is configured to obtain a reference signal subset and a precoding matrix, wherein the reference signal subset is a subset of a reference signal port set configured in the reference signal resource, and the precoding matrix is used for precoding the reference signal subset.

The received power calculating module 113 is configured to obtain signal received power according to the reference signal subset and the precoding matrix.

Further, the user equipment (UE) 11 may further include the following module:

a path loss calculating module 114, configured to calculate path loss based on the signal received power;

or a reporting module 115, configured to report the signal received power to the base station eNB 12.

Specifically, the first obtaining module 111 may obtain the reference signal resource by receiving a notification of the eNB 12, such as, for example, a radio resource control (Radio Resource Control, RRC) signaling or downlink control information (Downlink control information, DCI); or obtain the reference signal resource based on predefined information, such as, for example, a cell identifier.

Specifically, the reference signal resource may be reference signal resource notified by the base station eNB through a signaling, which includes reference signal resource sent to the user equipment (UE) by the eNB through an RRC signaling or DCI.

Specifically, the reference signal resource may be channel state information reference signal (channel state information Reference Signal, CSI RS) resource, wherein the CSI RS resource may be a combination of a resource configuration and a subframe configuration of CSI RS. The resource configuration may be a port configuration of CSI RS in a resource block (RB, Resource Block), such as, for example, occupying different subcarriers, symbols or sequences. The subframe configuration may be a period or an offset of subframes.

The reference signal resource may also be demodulation reference signal (demodulation RS, DM RS) resource, wherein the DM RS resource may be a resource configuration of DM RS, such as, for example, a port. The DM RS resource may also be a combination of a resource configuration and a subframe configuration of DM RS, such as, for example, DMRSs with different ports and with different subframe periods or offsets, wherein a period or an offset of DMRS subframes may be predefined and are known to both of the UE and the eNodeB.

The reference signal resource may also be cell-specific reference signal (cell-specific RS, CRS) resource. The CRS resource may be a resource configuration including CRS, such as, for example, a port; or may be a combination of a resource configuration and a subframe configuration of CRS, such as, for example, CRSs with different ports and with different subframe periods or offsets, wherein a period or an offset of CSI subframes may be predefined and are known to both of the UE and the eNodeB.

The reference signal resource may be UE-specific, or may be cell-specific.

The reference signal subset obtained by the second obtaining module 12 may be predefined. For example, it is predefined to select the first reference signal or select the first and the second reference signals of the reference signal port set configured in the configured reference signal resource as the reference signal subset.

A subset of reference signals may also be notified by an eNB through an RRC signaling, or be through downlink control information (DCI), or be selected, in accordance with an instruction on a downlink control channel, from existing reference signal resources notified by an RRC signaling.

The second obtaining module 112 may obtain the reference signal subset based on predefined information or by receiving a signaling, such as, for example, an RRC signaling or DCI.

It should be noted that, the reference signal subset may only include one reference signal or a plurality of reference signals or all reference signals in the reference signal port set configured in the reference signal resource.

The reference signal subset may be cell-specific or node-specific, or may be UE-specific.

The precoding matrix obtained by the second obtaining module 112 is contained in a precoding matrix set or in a codebook, and each precoding matrix in the precoding matrix set or in the codebook is indicated by one or multiple indexes.

Obtaining the precoding matrix by the second obtaining module 112 includes that, the second obtaining module 112 obtains an index for indicating a precoding matrix, which is notified to the second obtaining module 112 by the base station eNB 12. The precoding matrix is obtained from notification information for indicating one or multiple indexes for indicating a precoding matrix, that is sent by the base station eNB 12, and the eNB 12 may semi-statically notify the index(es) through a radio resource control (RRC) signaling or dynamically notify the index(es) through downlink physical control information (DCI).

The one or multiple indexes for indicating a precoding matrix notified by the eNB 12 may be obtained in the following manners.

The base station eNB 12 may obtain the one or multiple indexes for indicating a precoding matrix based on an uplink reference signal, such as, for example, a sounding reference signal (Sounding RS, SRS), and by utilizing channel reciprocity, which is as described in the foregoing method embodiments.

The base station eNB 12 obtains one or multiple indexes for indicating a precoding matrix based on one or multiple pieces of CSI reported by the UE recently, wherein the CSI reported by the user equipment (UE) to the eNB is used for downlink data transmission, such as, for example, a physical downlink shared channel (PDSCH) transmission.

It should be noted that, when the eNB obtains the one or multiple indexes for indicating a precoding matrix based on one or multiple pieces of CSI reported by the UE recently, the base station eNB may adjust an index notified to the UE according to practical requirements. For example, a tilt angle may be adjusted moderately according to an interference condition.

Obtaining the precoding matrix by the second obtaining module 112, may further include that, the second obtaining module 112 obtains an index for indicating a precoding matrix based on channel state information (CSI) reported by the present user equipment.

Specifically, the second obtaining module 112 may include the following units for obtaining an index for indicating a precoding matrix:

a CSI feedback unit, configured to obtain and report channel state information (CSI) to the eNB 12, wherein the channel state information contains one or multiple indexes for indicating a precoding matrix.

The reported CSI is used for downlink data transmission, such as, for example, a physical downlink shared channel (PDSCH) transmission; and one or multiple indexes in one or multiple pieces of latest CSI reported by the UE may be utilized to obtain a precoding matrix indicated by the index(es) by looking up a precoding matrix set or a codebook. How to calculate the CSI to the eNB reported by the user equipment (UE) is the prior art, and will not be described redundantly herein.

The index may be a rank indicator (Rank Indicator, RI) and a precoding matrix (Precoding Matrix Indicator, PMI) indicator, namely, RI/PMI, or may be only a PMI indicator.

Obtaining the precoding matrix by the second obtaining module 112 may further includes that, the second obtaining module 112 obtains a predefined index for indicating a precoding matrix.

The precoding matrix is predefined. For example, there exists a mapping relationship or a functional relationship between an index for indicating a precoding matrix and a reference signal port, wherein the predefined index for indicating a precoding matrix is associated with a specific subframe or timeslot.

After obtaining the reference signal resource and the precoding matrix, the received power calculating module 113 calculates signal received power, which specifically includes the following units:

a first calculating unit 1131, configured to obtain channel estimation according to the reference signal subset;

a second calculating unit 1132, configured to obtain precoded channel estimation according to the value of the channel estimation and the precoding matrix; and a third calculating unit 1133, configured to linearly average received powers of the precoded channel estimation on a considered measurement bandwidth to obtain signal received power.

Referring again to FIG. 7 for the base station eNB 12. The base station eNB 12 may specifically include the following modules:

an configuring module 121, configured to configure reference signal resource; and a sending module 122, configured to send a reference signal subset, or send a reference signal subset and a precoding matrix to the user equipment (UE) 11, so as to enable the user equipment (UE) 11 to obtain signal received power based on the reference signal subset or based on the reference signal subset and the precoding matrix;

wherein the reference signal subset is a subset of a reference signal port set configured in the reference signal resource. The reference signal subset sent by the sending module 122 is a subset predefined based on a reference signal port set configured in the reference signal resource; or is a subset notified to the user equipment (UE) 11 by the base station 12, and for example, notified to the user equipment (UE) 11 through RRC signaling or downlink control information (DCI).

Wherein sending the reference signal subset or sending the reference signal subset and the precoding matrix to the user equipment (UE) 11 by the sending module 122 includes the following steps:

sending the reference signal subset to the user equipment (UE) 11, so as to enable the UE 11 to obtain the signal received power based on the reference signal subset and a precoding matrix obtained from channel state information (CSI) reported by the UE recently, or based on a predefined precoding matrix;

or sending the reference signal subset to the user equipment (UE) 11, and sending one or multiple indexes for indicating a precoding matrix to the UE 11 by carrying the one or multiple indexes in notification information:

wherein the precoding matrix is contained in a precoding matrix set or a codebook, and each precoding matrix in the precoding matrix set or the codebook is indicated by one or multiple indexes.

The one or multiple indexes for indicating the precoding matrix are obtained by the module 122 based on the received channel state information (CSI) reported by the user equipment (UE) 11, and the channel state information (SCI) contains the one or multiple indexes for indicating the precoding matrix;

or the one or multiple indexes for indicating the precoding matrix are obtained by the module 122 based on an uplink reference signal, such as, for example, a sounding reference signal (Sounding RS, SRS), by utilizing channel reciprocity.

In addition, the base station eNB 12 may further include a receiving module 123, configured to receive signal received power reported by the user equipment (UE), which is taken as reference signal received power for selecting a cell or a node.

It can be seen from the descriptions of the above-mentioned embodiment that, the present invention has the following advantages:

in the present invention, by obtaining reference signal resource, a reference signal subset and a precoding matrix, signal received power may be obtained under an circumstance that a tilt angle of a base station antenna (e.g., AAS) is controlled flexibly, and the signal received power is beneficial to achieve independent uplink power control and selection of a cell or a node under a scenario of the above-mentioned antenna configuration.

Figure 8:
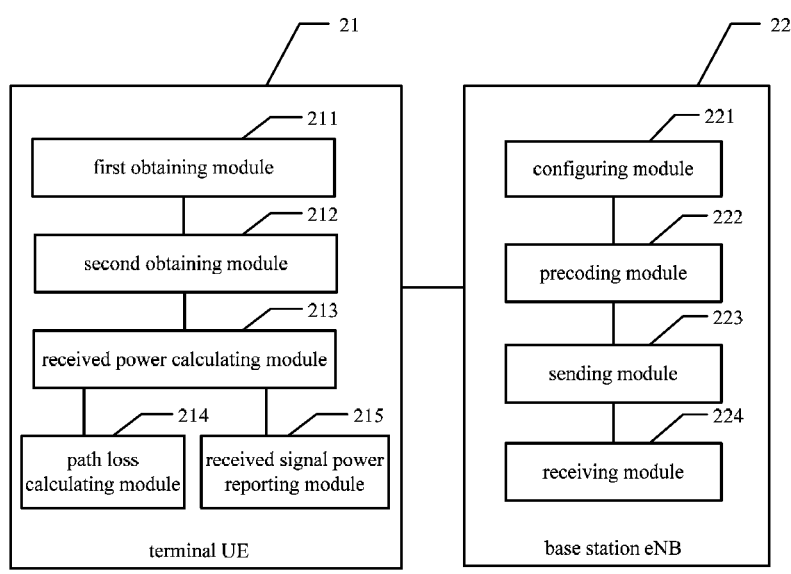
FIG. 8 is a schematic diagram of an arrangement of an embodiment of another system for measuring signal received power.

Referring again to FIG. 8, a schematic diagram of an arrangement of an embodiment of another system for measuring signal received power. In the present embodiment, the system includes a user equipment (UE) 21 and a base station eNB 22, wherein, the user equipment (UE) 21 specifically includes a first obtaining module 211, a second obtaining module 212 and a received power calculating module 213.

The first obtaining module 211 is configured to obtain reference signal resource.

The second obtaining module 212 is configured to obtain a reference signal subset which is precoded.

The received power calculating module 213 is configured to obtain signal received power based on the reference signal subset which is precoded.

The reference signal subset is a subset of a reference signal port set configured in the reference signal resource, and the reference signal subset, which is precoded, is obtained by precoding the reference signal subset based on a precoding matrix by the base station eNB.

Further, the user equipment (UE) 21 may further include the following module:

a path loss calculating module 214, configured to calculate path loss based on the signal received power;

or a signal received power reporting module 215, configured to report the signal received power to the base station eNB 22.

The first obtaining module 211 may obtain the reference signal resource by receiving a notification of the eNB 22, such as, for example, a radio resource control (Radio Resource Control, RRC) signaling or downlink control information (Downlink control information, DCI); or obtain the reference signal resource based on predefined information, such as, for example, a cell identifier.

Specifically, the reference signal resource may be reference signal resource notified by the base station eNB through a signaling, which includes reference signal resource sent to the user equipment (UE) by the eNB through an RRC signaling or DCI.

Specifically, the reference signal resource may be channel state information reference signal (channel state information Reference Signal, CSI RS) resource, wherein the CSI RS resource may be a combination of a resource configuration and a subframe configuration of CSI RS. The resource configuration may be a port configuration of CSI RS in a resource block (RB, Resource Block), such as, for example, occupying different subcarriers, symbols or sequences. The subframe configuration may be a period or an offset of subframes.

The reference signal resource may also be demodulation reference signal (demodulation RS, DM RS) resource, wherein the DM RS resource may be a resource configuration of DM RS, such as, for example, a port. The DM RS resource may also be a combination of a resource configuration and a subframe configuration of DM RS, such as, for example, DMRSs with different ports and with different subframe periods or offsets, wherein a period or an offset of DMRS subframes may be predefined and are known to both of the UE and the eNodeB.

The reference signal resource may also be cell-specific reference signal (cell-specific RS, CRS) resource. The CRS resource may be a resource configuration including CRS, such as, for example, a port; or may be a combination of a resource configuration and a subframe configuration of CRS, such as, for example, CRSs with different ports and with different subframe periods or offsets, wherein a period or an offset of CSI subframes may be predefined and are known to both of the UE and the eNodeB.

The reference signal resource may be UE-specific, or may be cell-specific.

The reference signal subset obtained by the second obtaining module 212 may be predefined. For example, it is predefined to select the first reference signal or the first and the second reference signals in the reference signal set configured in the configured reference signal resource as the reference signal subset.

The reference signal subset may also be notified by the eNodeB, such as, for example, notified through RRC signaling or through downlink control information DCI, or be selected, in accordance with an instruction on a downlink control channel, from existing reference signal resources notified by an RRC signaling.

The user equipment (UE) may obtain the reference signal subset, which is precoded, based on predefined information or by receiving a notification, such as an RRC signaling or DCI.

The reference signal subset may be cell-specific or node-specific, or may be UE-specific.

The reference signal subset which is precoded and is obtained by the second obtaining module 212 is obtained by precoding the reference signal subset based on the precoding matrix by the base station eNB 22, which includes that, based on an uplink reference signal, such as, for example, a sounding reference signal (Sounding RS, SRS), by utilizing channel reciprocity, and based on a predefined criterion, such as, for example, a channel capacity maximization criterion or a throughput maximization criterion, the base station eNB 22 obtains the precoding matrix by means of singular value decomposition or eigenvalue decomposition, or obtains the precoding matrix by selecting from a predefined codebook.

Obtaining the reference signal subset, which is precoded, by the second obtaining module 212 includes the following steps: obtaining, by the base station eNB 22, an index for indicating a precoding matrix, obtaining the precoding matrix based on the index and precoding the reference signal subset based on the precoding matrix to obtain the reference signal subset which is precoded; wherein the obtaining, by the base station eNB 22, an index used for indicating a precoding matrix, includes that, the eNB 22 obtains one or multiple indexes for indicating a precoding matrix based on one or multiple pieces of CSI reported by the UE 21 recently; wherein the CSI reported to the eNB by the user equipment (UE) 21 is used for downlink data transmission, such as, for example, a physical downlink shared channel (PDSCH) transmission. Obtaining and reporting the CIS for downlink data transmission to the eNB by the user equipment (UE) is the prior art, and will not be repeated redundantly herein.

In this case, the second obtaining module 212 may include the following unit:

a CSI feedback unit, configured to obtain and report channel state information (CSI) to the eNB 22, wherein the channel state information contains one or multiple indexes for indicating a precoding matrix;

or, wherein obtaining the index for indicating the precoding matrix by the base station eNB 22 includes that the index for indicating the precoding matrix is predefined. For example, there exists a mapping relationship or a functional relationship between an index for indicating a precoding matrix and a reference signal port, wherein the mapping relationship or the functional relationship may be associated with a specific subframe or timeslot.

In the present embodiment, the base station eNB 22 specifically includes a configuring module 221, a precoding module 222 and a sending module 223.

The configuring module 221 is configured to configure reference signal resource.

The precoding module 222 is configured to precode a reference signal subset based on a precoding matrix to obtain a reference signal subset which is precoded, wherein the reference signal subset is a subset of a reference signal port set configured in the reference signal resource.

The sending module 223 is configured to send the reference signal subset, which is precoded, to the user equipment (UE) 21, so as to enable the user equipment (UE) 21 to obtain signal received power based on the reference signal subset which is precoded.

Wherein the reference signal subset is a subset of a reference signal port set configured in the reference signal resource. The reference signal subset, which is precoded, is obtained by precoding the reference signal subset based on the precoding matrix by the precoding module 222.

The subset is predefined based on the reference signal set configured in the reference signal resource, or is notified to the user equipment (UE) 11 by the eNB 22 through a notification, such as, for example, an RRC signaling or downlink control information (DCI).

The obtaining a reference signal subset, which is precoded, by precoding a reference signal subset based on a precoding matrix by the base station eNB 22 includes that, the precoding matrix is obtained by means of singular value decomposition or eigenvalue decomposition based on an uplink reference signal, such as, for example, a sounding reference signal (Sounding RS, SRS), by utilizing channel reciprocity, and based on a predefined criterion, such as, for example, a channel capacity maximization criterion or a throughput maximization criterion, or is obtained by selecting from a predefined codebook.

Or, the precoding module 222 is specifically configured to obtain an index for indicating a precoding matrix, obtain the precoding matrix based on the index and precode the reference signal subset based on the precoding matrix to obtain the reference signal subset which is precoded.

The index for indicating a precoding matrix is obtained based on channel state information (CSI) reported by the user equipment (UE), which includes that, the precoding module 222 obtains one or multiple indexes for indicating a precoding matrix based on one or multiple pieces of CSI reported by the UE recently; wherein the CSI reported to the eNB by the user equipment (UE) is used for downlink data transmission, such as, for example, a physical downlink shared channel (PDSCH) transmission. Reporting the CSI for downlink data transmission to the eNB by the user equipment (UE) is the prior art, and will not be described redundantly herein.

Or the index for indicating a precoding matrix is predefined. For example, there exists a mapping relationship or a functional relationship between an index for indicating a precoding matrix and a reference signal port, wherein the mapping relationship or the functional relationship may be associated with a specific subframe or timeslot.

A process for calculating the signal received power by the user equipment (UE) is the same as that in the above-mentioned embodiment.

In addition, the base station eNB 22 may further include a receiving module 224, configured to receive signal received power reported by the user equipment (UE), which is taken as reference signal received power for selecting a cell or a node.

It can be seen from the descriptions of the above-mentioned embodiment that, the present invention has the following advantages:

in the present invention, by obtaining reference signal resource, a reference signal subset and a precoding matrix, signal received power may be obtained under an circumstance that a tilt angle of a base station antenna (e.g., AAS) is controlled flexibly, and the signal received power is beneficial to achieve independent uplink power control and selection of a cell or a node under a scenario of the above-mentioned antenna configuration.

Those of ordinary skill in the art may understand that all or a part of the flows in the above-mentioned method embodiments may be implemented with a computer program instructing related hardware. The program may be stored in a computer readable storage medium, and when the program is executed, the program may include the flows of the above-mentioned method embodiments. Wherein the storage medium may be a magnetic disk, an optical disk, a read-only memory (Read-Only Memory, ROM), a random access memory (Random Access Memory, RAM) or the like.

The foregoing descriptions are merely preferred embodiments of the present invention, but the protection scope of the present invention is not limited thereto. Therefore, equivalent variations made according to the claims of the present invention still fall into the scope of the present invention.

What is claimed is:

1. A user equipment for measuring signal received power, comprising: a receiver, configured to obtain reference signal resource from a base station; and a processor, configured to obtain a reference signal subset and a precoding matrix from the reference signal resource, and obtain, according to the reference signal subset and the precoding matrix, the signal received power, wherein the reference signal subset is a subset of a reference signal port set configured in the reference signal resource, and the precoding matrix precodes the reference signal subset, wherein obtaining, according to the reference signal subset and the precoding matrix, the signal received power comprising: obtaining a channel estimation value according to the reference signal subset, obtaining a precoded channel estimation value according to the channel estimation value and the precoding matrix, obtaining multiple channel estimations based on respective resource units carrying the reference signals, obtaining corresponding received powers, and obtaining signal received power by linearly averaging the above-mentioned powers on the considered measurement bandwidth.

2. The user equipment of claim 1, the processor is further configured to determine path loss based on the signal received power.

3. The user equipment of claim 1, further comprising:
a transmitter, configured to report the signal received power to the base station.

4. The user equipment of claim 1, wherein the processor is configured to obtain an index for indicating the precoding matrix and obtain the precoding matrix based on the index.

5. The user equipment of claim 4, wherein the index for indicating the precoding matrix, which is obtained by the processor, is notified to the processor by the base station.

6. The user equipment of claim 5, wherein the index for indicating the precoding matrix, that is notified to the processor by the base station, is obtained by the base station based on channel state information (CSI) reported by the user equipment.

7. The user equipment of claim 4, wherein the index for indicating the precoding matrix, which is obtained by the processor, is obtained based on channel state information (CSI) reported by the user equipment.

8. The user equipment of claim 4, wherein the index for indicating the precoding matrix, which is obtained by the processor, is predefined.

9. The user equipment of claim 8, wherein the index for indicating the precoding matrix, which is predefined, is associated with one of a subframe and a timeslot.

10. The user equipment of claim 1, wherein the reference signal subset obtained by the processor is predefined.

11. The user equipment of claim 1, wherein the reference signal subset, which is obtained by the processor, satisfies a condition the reference signal subset is notified to the present user equipment by the base station.

12. A base station for measuring signal received power, comprising: a processor, configured to configure reference signal resource; and a transmitter, configured to send the reference signal resource to a UE, so as to enable the UE to obtain a reference signal subset and a precoding matrix from the reference signal resource, and obtain, based on the reference signal subset and the precoding matrix, the signal received power; wherein the reference signal subset is a subset of a reference signal port set configured in the reference signal resource, wherein the signal received power is obtained according to a precoded channel estimation value, wherein the precoded channel estimation value is obtained according to the channel estimation value and the precoding matrix, obtaining multiple channel estimations based on respective resource units carrying the reference signals, obtaining corresponding received powers, and obtaining signal received power by linearly averaging the above-mentioned powers on the considered measurement bandwidth.

13. The base station of claim 12, further comprising:
a receiver, configured to receive the signal received power reported by the UE.

14. The base station of claim 13, wherein the reference signal subset sent by the transmitter satisfies a condition that the reference signal subset is a subset notified to the UE by the base station.

15. The base station of claim 12, wherein the reference signal subset sent by the transmitter—is a predefined subset based on the reference signal port set configured in the reference signal resource.

16. The base station of claim 12, wherein when the transmitter sends the reference signal subset and the precoding matrix to the UE, the sent precoding matrix is obtained by the present base station based on channel state information (CSI) reported by the UE.

17. A system, comprising a base station, and a user equipment (UE), wherein the base station comprises: a processor, configured to configure reference signal resource; and a transmitter, configured to send one of (a) a reference signal subset and (b) sending the reference signal subset and a precoding matrix, to the UE, so as to enable the UE to obtain the signal received power based on one of (a) the reference signal subset and (b) the reference signal subset and the precoding matrix; wherein the reference signal subset is a subset of a reference signal port set configured in the reference signal resource; and wherein the user equipment comprises: a receiver, configured to obtain the reference signal resource from the base station; and a processor, configured to obtain the reference signal subset and the precoding matrix from the reference signal resource, and obtain, according to the reference signal subset and the precoding matrix, the signal received power, wherein the reference signal subset is a subset of a reference signal port set configured in the reference signal resource, and the precoding matrix precodes the reference signal subset, wherein the processor is further configured to obtain a channel estimation value according to the reference signal subset, obtain a precoded channel estimation value according to the channel estimation value and the precoding matrix, obtaining multiple channel estimations based on respective resource units carrying the reference signals, obtaining corresponding received powers, and obtaining signal received power by linearly averaging the above-mentioned powers on the considered measurement bandwidth.

* * * * *